US012404718B2

(12) United States Patent
Schulman

(10) Patent No.: US 12,404,718 B2
(45) Date of Patent: *Sep. 2, 2025

(54) VERTICAL CURTAIN BLIND AND RELATED CONNECTOR CLIPS AND PANELS FOR USE WITH A VERTICAL CURTAIN BLIND

(71) Applicant: Levolor, Inc., Atlanta, GA (US)

(72) Inventor: Michael Schulman, Decatur, GA (US)

(73) Assignee: Levolor, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,811

(22) Filed: May 28, 2024

(65) Prior Publication Data

US 2024/0309699 A1 Sep. 19, 2024

Related U.S. Application Data

(63) Continuation of application No. 17/396,138, filed on Aug. 6, 2021, now Pat. No. 12,024,945.

(Continued)

(51) Int. Cl.
*E06B 9/36* (2006.01)
*E06B 9/386* (2006.01)

(52) U.S. Cl.
CPC .............. *E06B 9/367* (2013.01); *E06B 9/386* (2013.01)

(58) Field of Classification Search
CPC . E06B 9/36; E06B 9/362; E06B 9/367; E06B 9/262; E06B 2009/2625; A47H 13/01; A47H 13/14; A47H 13/00
See application file for complete search history.

(56) References Cited

U.S. PATENT DOCUMENTS 3,125,154 A 3/1964 Woodle
3,298,425 A 1/1967 Cayton
(Continued)

FOREIGN PATENT DOCUMENTS

AU 2016/102074 A4 1/2017
EP 1146198 A2 10/2001
(Continued)

OTHER PUBLICATIONS

Prior Art Connector 1.
Prior Art Connector 2.

*Primary Examiner* — Johnnie A. Shablack
(74) *Attorney, Agent, or Firm* — Dority & Manning, P.A.

(57) ABSTRACT

A vertical curtain blind includes a panel assembly having a plurality of individual panels coupled together in a side-by-side arrangement. Each panel extends in a vertical direction between a top end and a bottom end. Additionally, each panel includes first and second pockets positioned along first and second sides of the panel, respectively, adjacent to the top end of the panel. The blind associated includes a plurality of clip assemblies, with each clip assembly being configured to couple a respective pair of adjacent panels of the plurality of panels together. Each clip assembly includes a first connector clip positioned within the first pocket of a first panel of the respective pair of adjacent panels and a second connector clip positioned within the second pocket of an adjacent second panel of the respective pair of adjacent panels, with the first connector clip configured to be coupled to the second connector clip.

20 Claims, 11 Drawing Sheets

Related U.S. Application Data

(60) Provisional application No. 63/065,178, filed on Aug. 13, 2020.

(56) References Cited

U.S. PATENT DOCUMENTS

| | | | |
|---|---|---|---|
| 3,844,330 | A | 10/1974 | Hyman |
| 3,851,699 | A | 12/1974 | Shapiro |
| 4,116,257 | A | 9/1978 | Bratschi |
| 4,291,738 | A | 9/1981 | Grenga |
| 4,356,855 | A | 11/1982 | Holzer |
| 5,012,552 | A | 5/1991 | Wulf |
| 5,168,913 | A | 12/1992 | Haines |
| 5,297,607 | A | 3/1994 | Beauchamp |
| 5,638,880 | A | 6/1997 | Colson |
| 5,715,883 | A | 2/1998 | Keith |
| 5,749,404 | A | 5/1998 | Colson |
| D397,571 | S | 9/1998 | Anthony |
| 6,186,213 | B1 | 2/2001 | Senesac |
| 6,311,755 | B1 | 11/2001 | Ruggles |
| 6,334,477 | B1 | 1/2002 | Moir |
| 6,510,885 | B1 | 1/2003 | Shih |
| 6,675,858 | B2 | 1/2004 | Marocco |
| 6,761,782 | B2 | 7/2004 | Swiszcz et al. |
| 6,786,269 | B2 | 9/2004 | Senesac |
| 6,789,596 | B1 | 9/2004 | Lin |
| 7,163,043 | B2 | 1/2007 | Huang |
| 7,165,594 | B2 | 1/2007 | Senesac |
| 7,556,081 | B2 | 7/2009 | Cech |
| 9,140,061 | B2 | 9/2015 | Cha |
| D751,907 | S | 3/2016 | Donadee |
| 9,702,185 | B2 | 7/2017 | Jelic |
| 11,187,031 | B2 | 11/2021 | Huang |
| 11,346,152 | B2 | 5/2022 | Wong |
| 12,024,945 | B2 * | 7/2024 | Schulman ............... E06B 9/386 |
| 12,110,740 | B2 * | 10/2024 | Huang ...................... E06B 9/38 |
| 12,173,557 | B2 * | 12/2024 | Albertini ................. E06B 9/367 |
| 2004/0163295 | A1 | 8/2004 | Fontana |
| 2005/0211392 | A1 | 9/2005 | Elembaby |
| 2006/0249261 | A1 | 11/2006 | Elembaby |
| 2007/0006979 | A1 | 1/2007 | Hsu |
| 2007/0267153 | A1 | 11/2007 | Hardy |
| 2008/0236766 | A1 | 10/2008 | Vandervoort |
| 2011/0056630 | A1 | 3/2011 | Buccola |
| 2013/0145543 | A1 | 6/2013 | Cittadino et al. |
| 2017/0354285 | A1 | 12/2017 | Kim |
| 2018/0102073 | A1 | 4/2018 | Cleeves |
| 2018/0102074 | A1 | 4/2018 | Peters |
| 2018/0102075 | A1 | 4/2018 | Peters |
| 2018/0298684 | A1 | 10/2018 | Siebenaller |
| 2019/0376338 | A1 | 12/2019 | Huang |
| 2020/0308733 | A1 | 10/2020 | Byun |
| 2023/0003082 | A1 * | 1/2023 | Albertini ................. E06B 9/362 |
| 2023/0046453 | A1 | 2/2023 | Williams |
| 2023/0132417 | A1 | 5/2023 | Huang |

FOREIGN PATENT DOCUMENTS

| | | | |
|---|---|---|---|
| GB | 2549637 | A | 10/2017 |
| WO | WO 2006/098555 | A1 | 9/2006 |
| WO | WO 2011/155675 | A1 | 12/2011 |
| WO | WO 2018/080016 | A1 | 5/2018 |

* cited by examiner

VERTICAL CURTAIN BLIND AND RELATED CONNECTOR CLIPS AND PANELS FOR USE WITH A VERTICAL CURTAIN BLIND

PRIORITY CLAIM

The present application is a continuation of U.S. Non-Provisional Patent Application Ser. No. 17/396,138, filed Sep. 6, 2021, which is based upon and claims the right of priority to U.S. Provisional Patent Application No. 63/065,178, filed Aug. 13, 2020. Applicant claims priority to and the benefit of each of such applications and incorporates all such applications herein by reference in its entirety.

FIELD

The present subject matter relates generally to window coverings for architectural structures and, more particularly, to a vertical curtain blind or drapery including connector clips for coupling adjacent panels of the blind to each other as well as coupling the panels to mounting hardware to suspend the blind from an associated rail or track.

BACKGROUND

Draperies or vertical curtain blinds are a popular type of covering used in residential and commercial applications to cover a window, door, and/or other architectural structures. Various types or configurations of vertical curtain blinds have been developed over the years. For example, vertical curtain blinds are commercially available that include a plurality of panels configured to be suspended relative to a track or headrail. In some instances, the panels have a hybrid configuration including both light-transmitting sections and light-blocking sections. In such instances, the panels are typically configured to be tilted to adjust the light-transmitting/blocking state of the blind.

With such blinds, it is known to suspend the individual panels from the associated track or headrail using clamp-type connectors. For example, US Patent Publication No. 2017/0354285 (Kim) discloses connectors for a blind-type curtain that are configured to clamp-over the top ends of adjacent panels to allow the panels to be suspended from an associated rail. However, such clamp-type connectors suffer from various drawbacks. For instance, the connection between the connectors and the associated rail mounting hardware is positioned significantly above the top ends of the panels, thereby creating the potential for large light gaps between the panels and the rail. Moreover, given their exterior clamping configuration, the connectors are clearly visible along the top ends of the panels, which can be an undesirable aesthetic for many consumers.

Accordingly, a vertical curtain blind having improved connectors for coupling adjacent panels of the blind to each other as well as coupling the panels to mounting hardware to suspend the blind from an associated rail or track would be welcomed in the technology. In addition, related panel configurations for accommodating the improved connectors would also be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a vertical curtain blind. The blind includes a panel assembly having a plurality of individual panels coupled together in a side-by-side arrangement. Each panel extends in a vertical direction between a top end and a bottom end. Additionally, each panel includes first and second pockets positioned along first and second sides of the panel, respectively, adjacent to the top end of the panel. The blind associated includes a plurality of clip assemblies, with each clip assembly being configured to couple a respective pair of adjacent panels of the plurality of panels together. Each clip assembly includes a first connector clip positioned within the first pocket of a first panel of the respective pair of adjacent panels and a second connector clip positioned within the second pocket of an adjacent second panel of the respective pair of adjacent panels, with the first connector clip configured to be coupled to the second connector clip.

In another aspect, the present subject matter is directed to a clip assembly for removably coupling adjacent panels of a vertical curtain blind together. The clip assembly includes a first connector clip having a first clip body extending in a lengthwise direction between a first end and a second end of the first connector clip and in a heightwise direction between a top side and a bottom side of the first connector clip. The first clip body includes connection structure. The clip assembly also includes a second connector clip having a second clip body extending in the lengthwise direction between a first end and a second end of the second connector clip and in the heightwise direction between a top side and a bottom side of the second connector clip. The second clip body includes connection structure configured to engage the connection structure of the first connector clip to removably couple the first connector clip to the second connector clip. When the first and second connector clips are coupled together, a connection interface is defined between adjacent outer faces of the first and second connector clips. Additionally, at least one of the first connector clip or the second connector clip includes retention structure separate from the connection structures of the first and second connector clips that extends outwardly from an outer face of the at least one of the first connector clip or the second connector clip positioned opposite the connection interface defined between the first and second connector clips.

In a further aspect, the present subject matter is directed to a panel for a vertical curtain blind, with the panel extending in a vertical direction between a top end and a bottom end of the panel. The panel includes a light-transmitting panel portion extending in the vertical direction between the top and bottom ends of the panel, and first and second light-blocking panel portions extending in the vertical direction between the top and bottom ends of the panel along opposed sides of the light-transmitting portion. In addition, the panel includes a first pocket extending laterally along the top end of the panel across at least a portion of the first light-blocking panel portion, and a second pocket extending laterally along the top end of the panel across at least a portion of the second light-blocking panel portion.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

In general, the present subject matter is directed to a vertical curtain blind for an architectural feature or structure (referred to herein simply as an architectural "structure" for the sake of convenience and without intent to limit). In several embodiments, the vertical curtain blind includes a panel assembly formed from a plurality of individual panels coupled together in a side-by-side arrangement. In addition, the blind includes a clip assembly for coupling adjacent panels of the panel assembly together. The clip assembly includes first and second connector clips configured to be coupled to each other.

In accordance with aspects of the present subject matter, each panel of the panel assembly includes first and second pockets positioned along opposed first and second sides of the panel, respectively. In such embodiments, the first connector clip of each clip assembly is configured to positioned within the first pocket of a first panel of a respective pair of adjacent panels and the second connector clip is configured to be positioned within the second pocket of an adjacent second panel of the respective pair of adjacent panels. As a result, when the first and second connector clips are coupled together, the first and second panels may be similarly coupled together at the locations of their adjacent pockets (e.g., at the top ends of the panels).

Advantageously, by configuring the connector clips to be received within pockets defined or formed in the panels, the clips can be entirely or substantially hidden from view when the various panels are assembled together to form the panel assembly. As a result, the assembled blind is very aesthetically appealing, particularly when compared to conventional blinds that include exterior, clamp-style connectors. Additionally, due to the pocket-based configuration, the connection provided between the clips and associated mounting hardware used to suspend the panel assembly relative to a corresponding rail or track is recessed below the top end of the panel assembly. As a result, the top end of the panel assembly may be positioned directly adjacent to the track thereby eliminating (or at least minimizing) light gaps between the panel assembly and the track.

Figure 1:
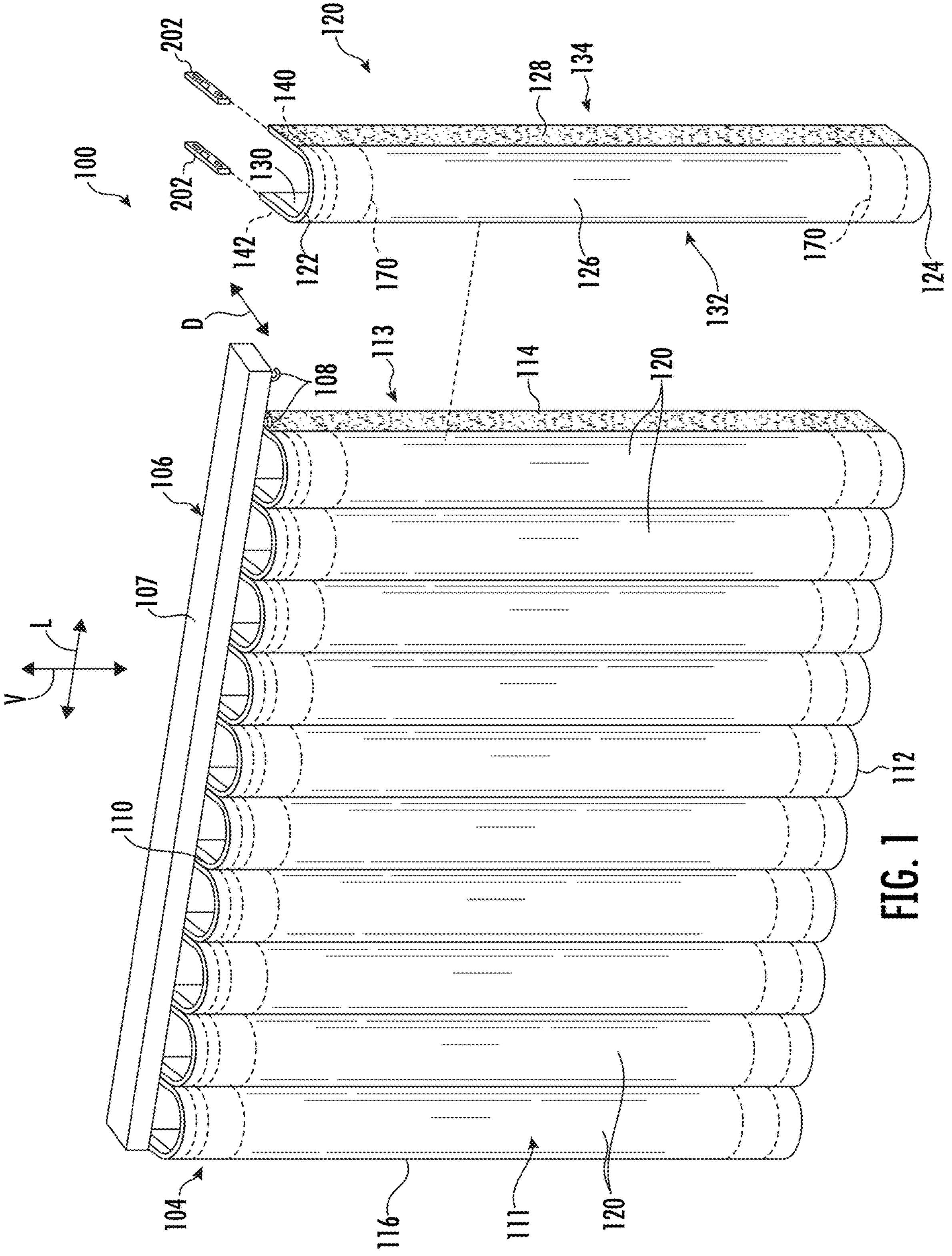
FIG. 1 illustrates a perspective view of one embodiment of a vertical curtain blind in accordance with aspects of the present subject matter, particularly illustrating a panel assembly of the blind at an extended, opened position with one of the panels exploded away from the remainder of the panel assembly.
Figure 2:
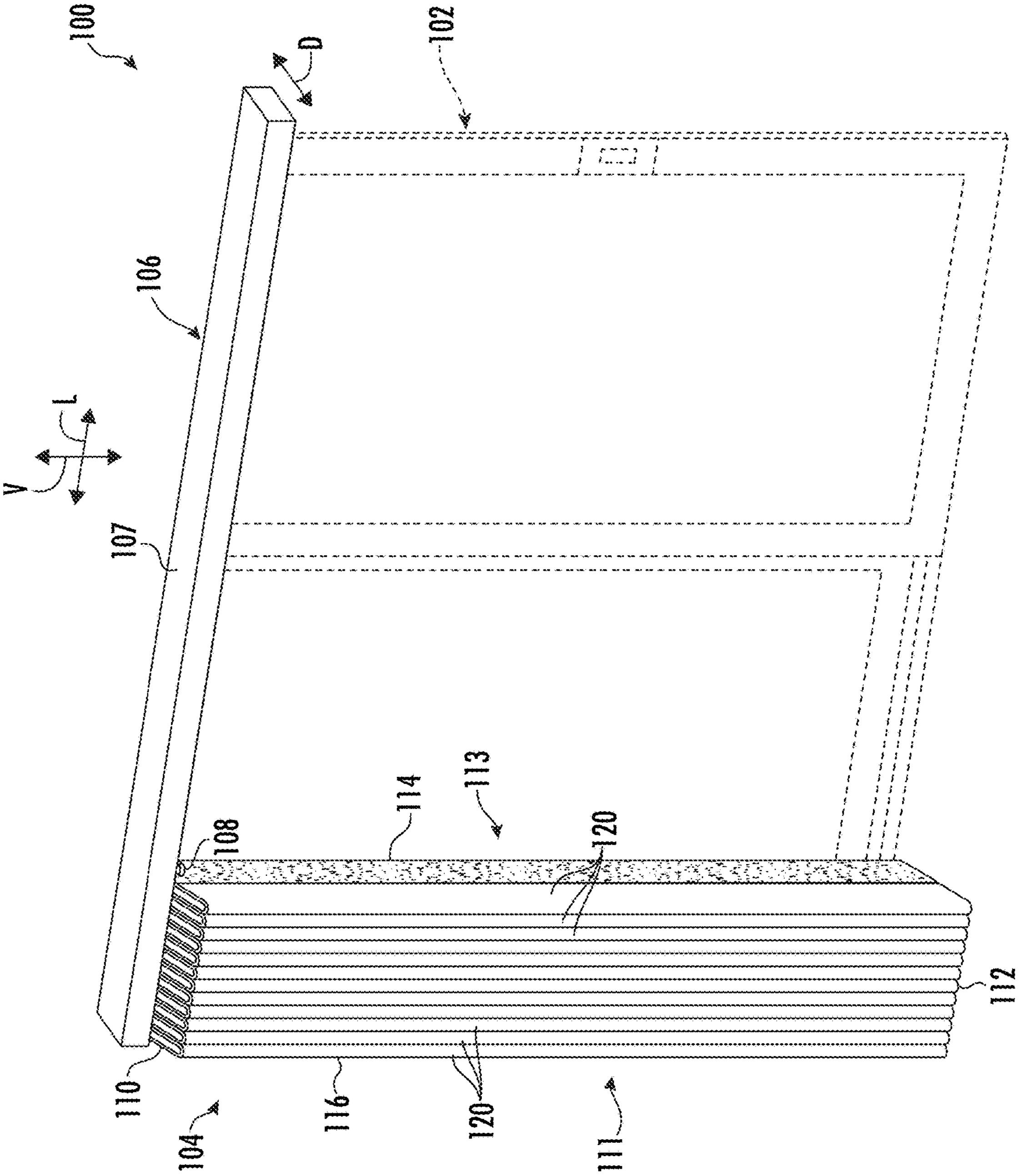
FIG. 2 illustrates another perspective view of the vertical curtain blind shown in FIG. 1, particularly illustrating the panel assembly at a retracted position.
Figure 3:
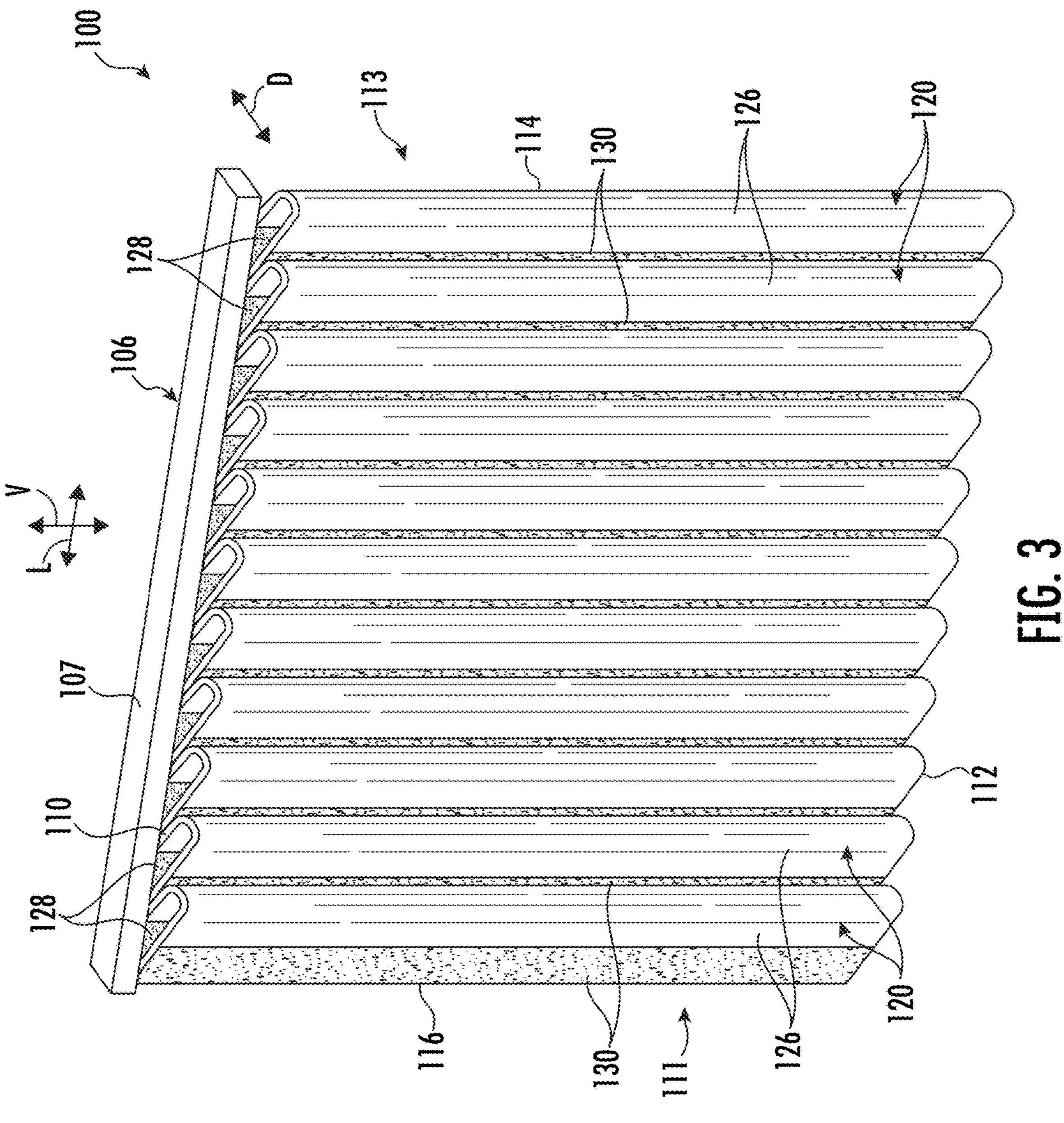
FIG. 3 illustrates a further perspective view of the vertical curtain blind shown in FIG. 1, particularly illustrating the panel assembly at an extended, closed position.

Referring now to the drawings, FIGS. 1-3 illustrate perspective views of one embodiment of a vertical curtain blind 100 configured for use as a covering for an architectural structure (e.g., indicated by dashed lines 102 in FIG. 2) in accordance with aspects of the present subject matter. In general, the blind 100 may correspond to a vertical covering (e.g., a vertical drapery) including a panel assembly 104 configured to be installed relative to a window, door, or other architectural structure as may be desired. In one embodiment, the panel assembly 104 may be placed in operative association with a head rail assembly, blind tract assembly, a carrier assembly, or any other suitable support structure 106 that is configured to vertically support the panel assembly 104 relative to an architectural structure 102. For instance, as shown in FIGS. 1-3, the panel assembly 104 may, for example, be suspended from a rail or track 107 of the support structure 106 relative to the architectural structure 102 by a plurality of carriers or hangers 108. As will be described in greater detail below, the panel assembly 104 is configured to be coupled to the various hangers 108 via associated connector clips 202 (FIG. 1) installed within corresponding pockets of the panel assembly 104. It should be understood that the disclosed blind 100 is not limited in its particular use as a covering for a window or door, and may be used in any application as a partition, shade, and/or the like, relative to and/or within any type of architectural structure.

As shown in the illustrated embodiment, when suspended by the support structure 106 relative to an architectural structure 102, the panel assembly 104 may be moveable horizontally or laterally between an extended position (FIG. 1) and a retracted position (FIG. 2). When extended, the panel assembly 104 may be configured to extend across and at least partially cover the adjacent architectural structure 102. For example, the panel assembly 104 may be configured to extend in a heightwise or vertical direction (indicated by arrow V shown in FIGS. 1-3) between a top end 110 and a bottom end 112 and in a horizontal or lateral direction (indicated by arrow L in FIGS. 1-3) between a first lateral end 114 and a second lateral end 116. When retracted, the panel assembly 104 may generally be configured to be collapsed in the lateral direction L to allow the blind 100 to be positioned along one side of the adjacent architectural structure 102, thereby exposing at least a portion of the architectural structure 102. It should be appreciated that the lateral movement of the panel assembly 104 relative to the architectural structure 102 may be achieved, for example, by sliding the hangers 108 along the associated laterally extending track 107 of the support structure 106.

In several embodiments, the panel assembly 104 is formed from a plurality of individual panels 120 (e.g., fabric panels) configured to be coupled together in a side-by-side arrangement along the lateral direction L of the blind 100. As particularly shown in FIG. 1, each panel 120 generally extends in the vertical direction V between a top panel end 122 and a bottom panel end 124, with the top ends 122 of the panels 120 configured to be positioned adjacent to the track 107 of the support structure 106 when suspended relative thereto (e.g., via the hangers 108 and connector clips 202). In several embodiments, each panel 120 may be configured to define a curved or U-shaped cross-sectional profile when suspended relative to the support structure 106 in an extended, opened state (e.g., as shown in FIG. 1—see also FIGS. 7-10). For instance, as particularly shown in FIG. 1, each panel 120 may include a front wall 126 (also referred to herein as the light-transmitting portion or panel section of each panel 120) that defines a curved or arcuate profile (e.g., when in the extended, opened state) and extends in the lateral direction L between opposed first and second lateral sidewalls 128, 130 of the panel 120 (also referred to herein as the light-blocking portions or panel sections of each panel 120), with the various walls 126, 128, 130 extending in the vertical direction V between the top and bottom ends 122, 124 of the panel 120. Additionally, each panel 120 may extend in a depthwise direction (indicated by arrow D in FIGS. 1-3) between a front side 132 and a rear side 134, with the front sides 132 of the respective panels 120 being generally configured to be positioned along a front face 111 of the panel assembly 104 while the rear sides 134 of the respective panels 120 being generally configured to be positioned along a rear face 113 of the panel assembly 104.

It should be appreciated that the terms "front" and rear" are generally used herein simply to distinguish opposite sides or faces of the blind 100, itself, and/or opposite sides or faces of components or features of the blind 100. For purposes of description, the front face 111 of the panel assembly 104 (along with the front sides 132 of the panels 120) will be described herein as being positioned along the side of the blind 100 facing towards the interior of the room within which the blind 100 is installed, with the rear face 113 of the panel assembly 104 (along with the rear sides 134 of the panels 120) facing towards the adjacent architectural structure 102. However, in general, one of ordinary skill in the art should readily appreciate that the front face 111 of the panel assembly 104 may generally be configured to face in either direction relative to the interior of the room.

In addition to being extended and retracted in the lateral direction L to selectively expose/cover the adjacent architectural structure 102, the panel assembly 104 may also be configured to be adjusted between opened and closed states. Specifically, the various panels 120 may be configured to be rotated or tilted (e.g., via the associated hangers 108) between an opened state (e.g., as shown in FIG. 1), at which the lateral sidewalls 128, 130 of the various panels 120 are generally oriented substantially parallel to the depthwise direction D of the blind 100, with the front walls 126 of the panels 120 generally defining the front face 111 of the panel assembly 104, and a closed state (e.g., as shown in FIG. 3), at which the lateral sidewalls 128, 130 of the various panels 120 are tilted relative to the depthwise direction D into an overlapping configuration such that adjacent sidewalls 128, 130 of the panels 120 overlap each other along the lateral direction L of the blind 100. In this regard, by carefully selecting the light-blocking/transmitting properties of the various walls 126, 128, 130 of the panels 120, such tilting of the panel assembly 104 permits the blind 100 to be transitioned between different light-blocking/transmitting states. For example, in several embodiments, the lateral sidewalls 128, 130 of each panel 120 may have a light-blocking configuration (e.g., by being formed from a light-blocking or room-darkening material), while the front wall 126 of each panel 120 may have a light-transmitting configuration (e.g., by being formed entirely or substantially from a light-filtering or light-transmitting material). In such embodiments, when the panel assembly 104 is moved to the opened state, light may be allowed to pass between the non-tilted (relative to the depthwise direction D), non-overlapping lateral sidewalls 128, 130 of each panel 120 and through the front face 111 of the panel assembly 104 defined by the light-transmitting portion of each panel 120 (i.e., the front wall 126 of each panel 120), thereby providing an opened, light-transmitting position/state for the blind 100. In contrast, when the panel assembly 104 is moved to the closed state, the light-blocking portions of the panels 120 (i.e., the lateral sidewalls 128, 130 of the panels 120) are placed in an overlapping configuration such that the panels 120 function to block or substantially block light from passing through the panel assembly 104, thereby providing a closed, light-blocking position/state for the blind 100. It should be appreciated that above-described tilting of the panel assembly 104 may be achieved, for example, by rotating the various hangers 108 relative to the associated track 107 of the support structure 106 about respective tilt axes using any suitable tilting mechanism or system known in the art (e.g., suitable tilt mechanisms/systems conventionally used with vertical blinds).

As indicated above, the blind 100 also includes connector clips 202 for coupling the panel assembly 104 to the track 107 of the support structure 106 (e.g., via the hangers 108). Specifically, in several embodiments, each panel 120 defines first and second pockets 140, 142 (FIG. 1) (also referred to herein as right-side and left-side pockets 140, 142 for case of discussion) at its top end 122 for receiving respective connector clips 202 (also referred to herein as right-side and left-side clips 202 for ease of discussion). In such embodiments, by coupling the connector clips 202 of each panel 120 to corresponding hangers 108, the panels 120 (and, thus, the panel assembly 104) may be suspended relative to the track 107.

Additionally, the connector clips 202 may also function to connect or couple adjacent panels 120 together in a side-by-side arrangement along the top end 110 of the panel assembly 104. Specifically, as will be described in greater detail below, pairs of connector clips 202 (e.g., each including a left-side clip and a right-side clip) may form a clip assembly used to couple adjacent panels 120 to each other. For instance, the left-side clip 202 of a first clip assembly installed within the left-side pocket 142 of a first panel 120 may be configured to be coupled to the right-side clip 202 of the first clip assembly installed within the right-side pocket 140 of an adjacent second panel 120, thereby coupling the top ends 122 of the first and second panels 120 together along the adjacent sides of the panels 120 (and also allowing a single hanger 108 to be used to support such adjacent sides of the panels 120 relative to the track 107). Similarly, with reference to the same example, the right-side clip 202 of a second clip assembly installed within the right-side pocket 140 of the first panel 120 may be configured to be coupled to the left-side clip 202 of the second clip assembly installed within the left-side pocket 142 of an adjacent third panel 120 (e.g., disposed along the opposed side of the first panel 120 from the second panel 120), thereby coupling the top ends 122 of the first and third panels 120 together along the adjacent sides of the panels 120 (and also allowing a single hanger 108 to be used to support such adjacent sides of the panels 120 relative to the track 107).

It should be appreciated that, by configuring the connector clips 202 to be received within pockets 140, 142 defined or formed in the panels 120, the clips 202 can be entirely or substantially hidden from view when the various panels 120 are assembled together to form the panel assembly 104. Additionally, the pocket-based configuration also facilitates dropping or lowering the connection provided between the clips 202 and the hangers 108 of the support structure 106 to a position below the top end 110 of the panel assembly 104 (and, thus, the top ends 122 of the individual panels 120). As a result, the top end 110 of the panel assembly 104 may be positioned directly adjacent to the track 107 of the support structure, thereby eliminating (or at least minimizing) light gaps between the panel assembly 104 and the track 107.

Figure 4:
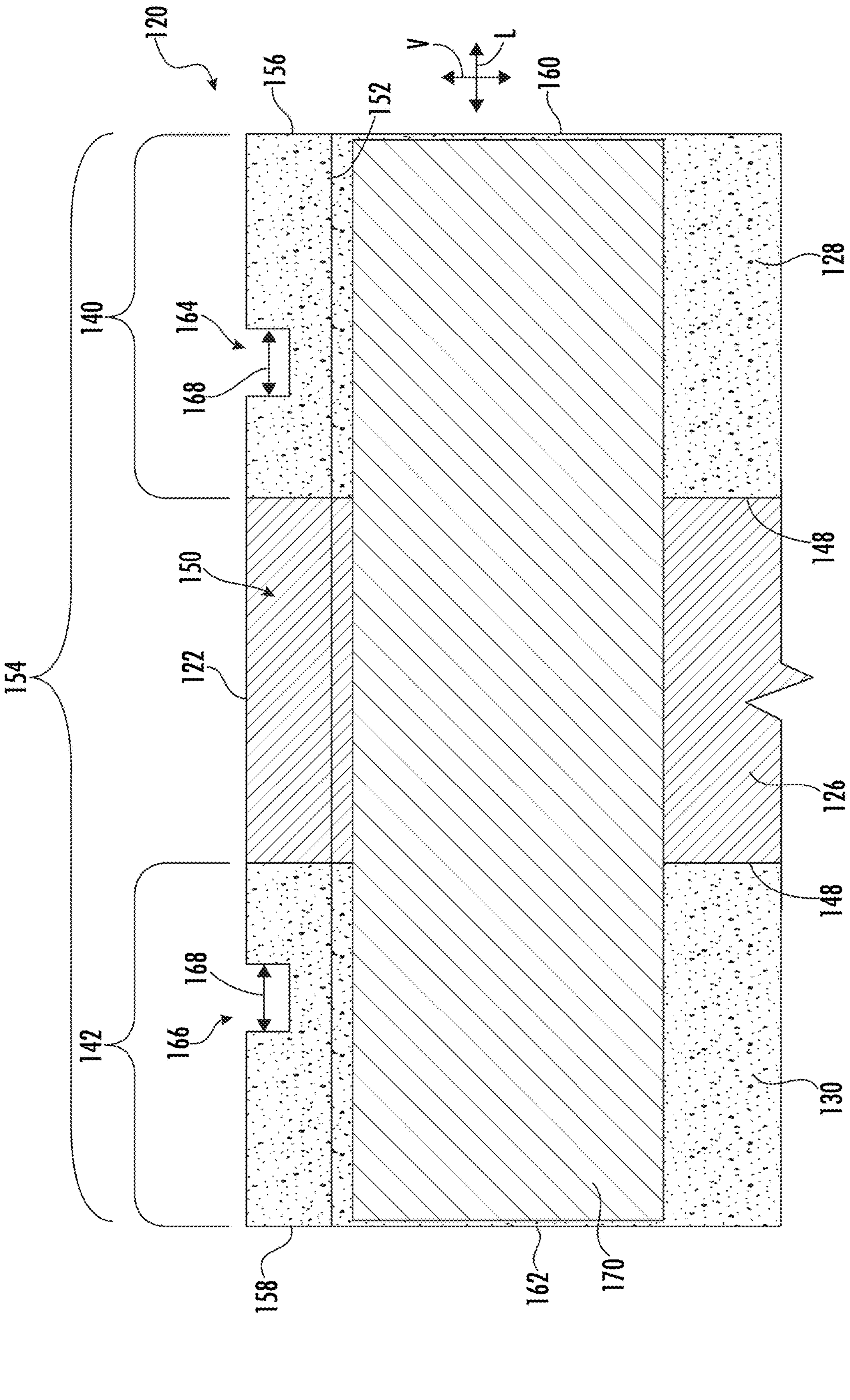
FIG. 4 illustrates a schematic view an upper portion of a panel suitable for use with a vertical curtain blind in accordance with aspects of the present subject matter.

Referring now to FIG. 4, a schematic view of the top end 122 of one of the panels 120 described above is illustrated in accordance with aspects of the present subject matter, particularly illustrating the panel 120 in a flattened or planar state for purposes of illustration. As indicated above, each panel 120 may include walls 126, 128, 130 having different light-blocking/transmitting characteristics or properties to provide the desired light-transmitting/blocking configuration(s) when transitioning the panel assembly 104 between its opened and closed states. Specifically, in several embodiments, the front wall 126 of each panel 120 may correspond to the light-transmitting portion or panel section of the panel 120 and, thus, may have a light-transmitting configuration (e.g., by being formed entirely or substantially from a light-filtering or light-transmitting material, such as a fabric having light-transmitting characteristics or a clear or transparent film material). In such embodiments, the lateral sidewalls 128, 130 of each panel 120 may correspond to the light-blocking portions of the panel 120 and, thus may have a light-blocking configuration (e.g., by being formed from a light-blocking material, such as a room-darkening material or a fabric having light-blocking characteristics). For instance, in one embodiment, the front wall 126 of each panel 120 may be formed from a sheer material while the lateral sidewalls 128, 130 of each panel 120 may be formed from a blackout or room-darkening material.

It should be appreciated that, in several embodiments, the various walls 126, 128, 130 of each panel 120 may correspond to separate panel strips (e.g., elongated, rectangular-shaped strips of material) that are configured to be assembled together to form the panel 120. In such embodiments, the separate strips of material may be connected to each other using any suitable connection means/process, such as by sewing, welding, gluing, taping, etc., the material strips together at each interface 148 defined between the strips. In one embodiment, each separate strip of material may be formed from a fabric (e.g., a woven or non-woven fabric), a film material, polymer material, and/or the like. Alternatively, the various walls 126, 128, 130 of each panel 120 may be formed integrally with one another. For instance, in one embodiment, each panel 120 may be formed from an integral weaving process during which the front wall 126 and lateral sidewalls 128, 130 are woven together as a single, continuously woven component. In such an embodiment, one or more weave characteristics (e.g., the weave pattern, weave density, and/or the like) may be altered between the front wall 126 and lateral sidewalls 128, 130 to provide the desired light-transmitting/blocking characteristics for each wall/portion of the panel 120.

Additionally, as indicated above, each panel 120 may include first and second pockets 140, 142 at its top end 122 for receiving a corresponding pair of connector clips 202 (FIG. 1). In one embodiment, the pockets 140, 142 may be formed by folding a lateral panel section 150 of the panel 120 over at the top end 122 and securing the folded panel section 150 along a seam or connection line (e.g., as indicated by line 152 in FIG. 4), such as by sewing, welding, gluing, taping, etc. the folded panel section 150 along the connection line 152. In such an embodiment, the first and second pockets 140, 142 may correspond to portions of a continuous pass-through channel 154 extending laterally across the panel 120 between opposed first and second open ends 156, 158 of the channel 154 and vertically between the top end 122 of the panel 120 and the connection line 152 at which the folded lateral section 150 is connected to the remainder of the panel 120. For example, as shown in FIG. 4, the first and second pockets 140, 142 generally correspond to the lateral portions of the continuous channel 154 that extend across the first and second lateral sidewalls 128, 130 of the panel 120. Specifically, in the illustrated embodiment, the first pocket 140 extends laterally between the first open end 156 of the channel 154 defined at an edge 160 of the first lateral sidewall 128 and the interface 148 defined between the first lateral sidewall 128 and the front wall 126. Similarly, the second pocket 142 extends laterally between the second open end 158 of the channel 154 defined at an edge 162 of the second lateral sidewall 130 and the interface 148 defined between the second lateral sidewall 130 and the front wall 126. It should be appreciated that, in other embodiments, the first and second pockets 140, 142 may be formed in any other suitable manner and/or may correspond to discrete or separate pockets positioned at the top end 122 of the panel 120. For instance, in another embodiment, the first and second pockets 140, 142 may be formed as separate pockets that are isolated from each other, such as by providing vertically extending seam or connection line(s) between the pockets 140, 142 to separate one from the other across the top end 122 of the panel 120.

Additionally, as shown in FIG. 4, the panel 120 also includes cut-out sections or access windows 164, 166 defined or formed at the top end 122 of the panel 120. Specifically, a first access window 164 is defined through a portion of the first pocket 140 at the top end 122 of the first lateral sidewall 128 of the panel 120 to provide access to the interior of such pocket 140, while a second access window 166 is defined through a portion of the second pocket 142 at the top end 122 of the second lateral sidewall 130 of the panel 120 to provide access to the interior of such pocket 142. As will be described below, a width 168 of each access window 164, 166 may be selected to provide access to or otherwise expose suitable structure of the connector clips 202 (e.g., when installed within the associated pockets 140, 142 of the panels 120) to facilitate, for example,: (1) coupling adjacent connector clips 202 (and, thus, the adjacent panels 120) to each other; (2) retaining the connector clips 202 relative to the adjacent panels 120; and/or (3) coupling the connector clips 202 to the hangers 108 for suspending the panels 120 relative to the track 107 of the support structure 106.

Moreover, in several embodiments, a stiffening member may be provided at one or more locations along the height of each panel 120 to provide additional stiffness to the panel 120, which can assist in maintaining the U-shaped cross-sectional profile of the panels 120 when installed relative to the support structure 106. For instance, as shown in FIG. 4, a stiffening member 170 has been installed at or adjacent to the top end 122 of the panel 120 (e.g., directly below the pockets 140, 142) that extends laterally across the panel 120. A similar stiffening member 170 may also be installed, for example, at or adjacent to the bottom end 124 of the panel 120 and/or at one or more other locations between the top and bottom ends 122, 124 of the panel 120. For instance, in the example embodiment shown in FIG. 1, each panel 120 is shown as including stiffening members 170 (indicated by dashed lines) located adjacent to both their top and bottom ends 122, 124. In one embodiment, each stiffening member 170 may comprise a stiffening tape applied laterally across the various walls 126, 128, 130 of the panel 120 (e.g., via a heat press). In such an embodiment, the stiffening tape may provide additional stiffness or rigidity to the panel 120 while still being sufficiently flexible to allow the panel 120 to be formed into its U-shaped cross-sectional profile.

Figure 5:
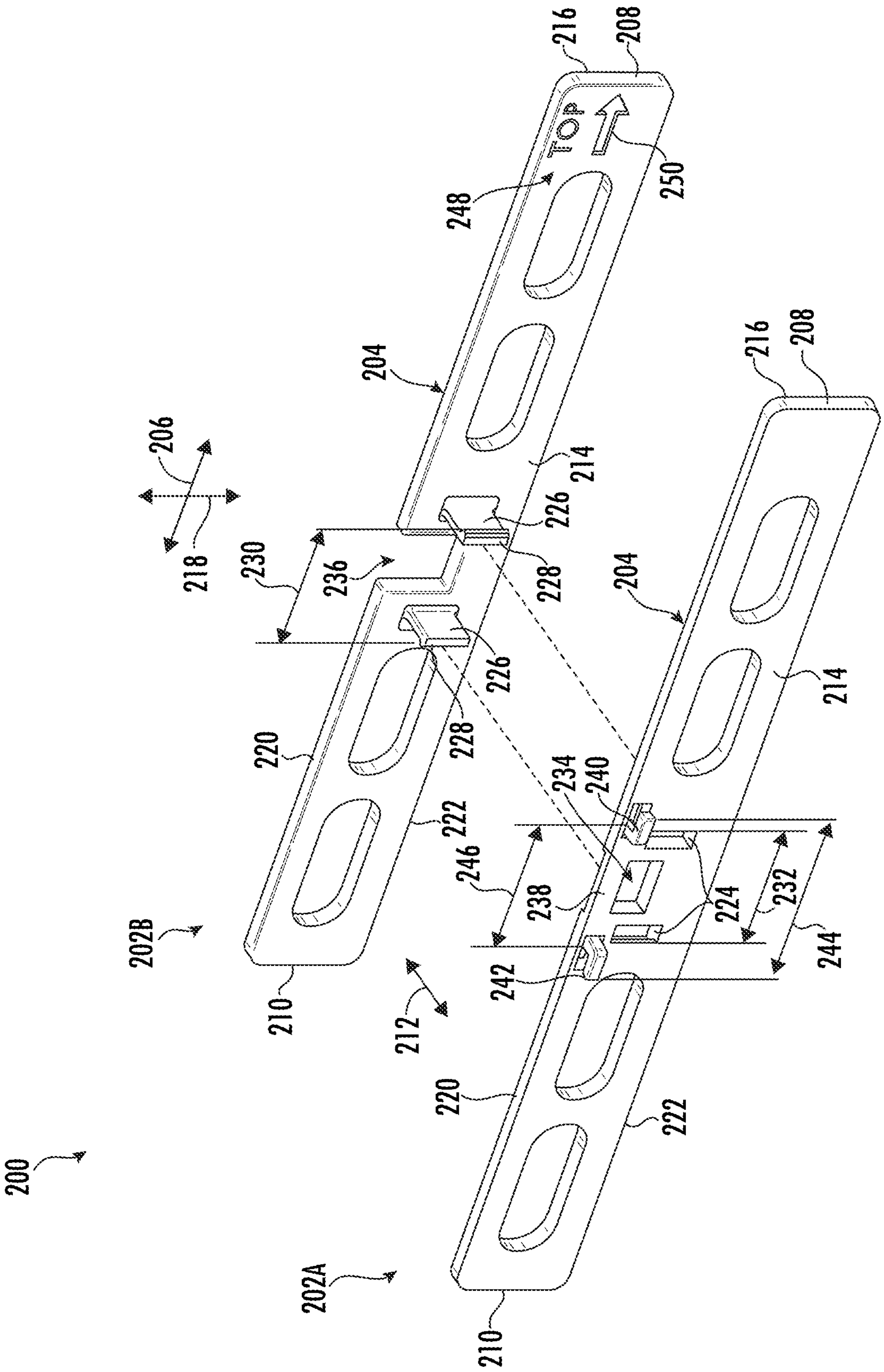
FIG. 5 illustrates a perspective view of one embodiment of connector clips of a clip assembly suitable for use in coupling adjacent panels of a vertical curtain blind together in accordance with aspects of the present subject matter.
Figure 6:
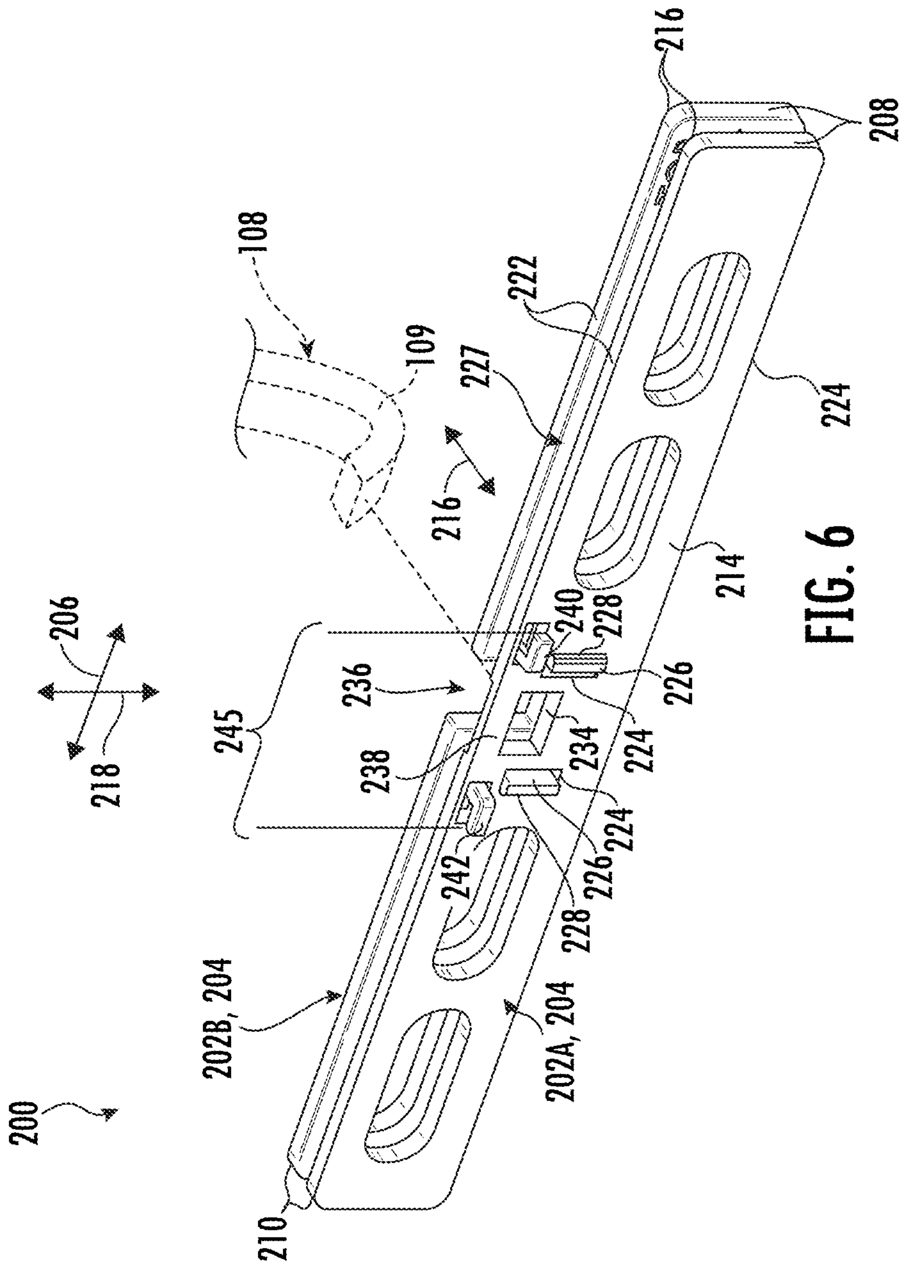
FIG. 6 illustrates another perspective view of the connector clips shown in FIG. 4, particularly illustrating the clips coupled to each other.

Referring now to FIGS. 5 and 6, perspective views of one embodiment of a clip assembly 200 suitable for coupling adjacent panels of a vertical curtain blind to each other and/or for coupling such panels to corresponding mounting hardware configured to suspend the blind relative to associated support structure are illustrated in accordance with aspects of the present subject matter. For purposes of discussion, the illustrated clip assembly 200 will be described with reference to the vertical curtain blind 100 and related panels 120 described above with reference to FIGS. 1-4. However, it should be appreciated that, in other embodiments, the clip assembly 200 may be utilized with blinds having any other suitable configuration and/or with panels having any other suitable panel configuration.

As shown in FIGS. 5 and 6, the clip assembly 200 includes a pair of connector clips 202, namely a first connector clip 202A and a second connector clip 202B. In general, each of the connector clips 202A, 202B includes an elongated clip body 204. As shown in the illustrated embodiment, each clip body 204 is generally configured as a rectangular-shaped, plate-like object extending in a lengthwise direction (indicated by arrow 206 in FIGS. 5 and 6) between a first end 208 and a second end 210 of the connector clip 202A, 202B and in a crosswise direction (indicated by arrow 212 in FIGS. 5 and 6) between a first face 214 and a second face 216 of the clip 202A, 202B. Additionally, the body 204 of each connector clip 202A, 202B extends in a heightwise direction (indicated by arrow 218 in FIGS. 5 and 6) between a top side 220 and a bottom side 222 of the clip 202A, 202B. In several embodiments, each clip body 204 is dimensionally configured (e.g., in the lengthwise, crosswise, and heightwise directions 206, 212, 218) to allow the associated connector clip 202A, 202B to be received within a corresponding pocket of a panel. For example, as will be described in greater detail below, when coupling adjacent first and second panels 120 to each other, the first connector clip 202A may be received within one of the pockets of the first panel 120 (e.g., the left-side or right-side pocket of the first panel 120), while the second connector clip 202B may be received within the pocket of the second panel positioned adjacent to the pocket of the first panel within which the first connector clip 202A is installed.

Moreover, each connector clip 202A, 202B includes connection structure for allowing the clips 202A, 202B to be removably coupled to each other. For instance, in the illustrated embodiment, the connector clips 202A, 202B include male/female connection structure for securing the clips 202A, 202B together. Specifically, as shown in FIG. 5, the first connector clip 202A includes fastener channels or openings 224 defined through its body 204 between the outer faces 214, 216 of the clip 202A that are configured to receive corresponding fastener arms 226 extending outwardly from the adjacent outer face of the second connector clip 202B (e.g., the first outer face 214 of the clip 202B). In such an embodiment, by aligning the fastener arms 226 of the second connector clip 220B with the fastener openings 224 defined by the first connector clip 202A and pressing the connector clips 202A, 202B together (e.g., in the crosswise direction 212), the arms 226 may be received within and extend through the openings 224 (e.g., as shown in FIG. 6) to couple the first connector clip 202A to the second connector clip 202B. As shown in FIG. 6, once coupled together, a connection interface 227 is defined between the connector clips 202A, 202B between the adjacent outer faces of the clips 202A, 202B (e.g., the second outer face 216 of the first clip 202A and the first outer face 214 of the second clip 202B), with the fastener arms 226 extending across the connection interface 227 in the crosswise direction 212.

In one embodiment, the fastener arms 226 may correspond to hook-like members or may otherwise include engagement features for engaging the adjacent face of the opposed connector clip upon being inserted through the fastener openings 224. For instance, as shown in FIG. 6, each fastener arm 226 of the second connector clip 202B includes an engagement flange 228 that overlaps the outer edges of the respective fastener openings 224 and engages the adjacent outer face 214 of the first connector clip 202A when the arms 226 are inserted sufficiently though the openings 224, thereby locking or otherwise securing the connector clips 202A, 202B together. Additionally, in one embodiment, a longitudinal spacing 230 (FIG. 5) defined between the ends of the engagement flanges 228 of the fastener arms 226 may be slightly larger than a corresponding longitudinal spacing 232 (FIG. 5) defined between the outer sides of the fastener openings 224, thereby requiring the fastener arms 226 to bow or flex inwardly towards each other as the arms 226 are inserted through the openings 224. As a result, the fastener arms 226 may subsequently snap-back outwardly away from each other once the engagement flanges 228 are inserted fully through the openings 224. In such an embodiment, to decouple the connector clips 202A, 202B, the fastener arms 226 may be pressed inwardly towards each other until the engagement flanges 228 clear the adjacent outer face 214 of the first connector clip 202A, at which point the arms 226 may be slid outwardly through the fastener openings 224 as the connector clips 202A, 202B are separated from each other (e.g., in the crosswise direction 212).

It should be appreciated that, in one embodiment, the longitudinal spacing 230, 232 defined between the fastener openings/arms 224, 226 may generally be selected to be less than the widths 168 (FIG. 4) of the access windows 164, 166 defined in the pockets 140, 142 within which the connector clips 202A, 202B are installed. As such, when using the connector clips 202A, 202B to couple adjacent panels 120 to each other, the connector clips 202A, 202B may be inserted within the respective pockets 140, 142 of the adjacent panels 120 such that the fastener openings 224 of the first connector clip 202A are generally aligned with the access window of its associated pocket (and, thus, are accessible along the exterior of the pocket) and the fastener arms 226 of the second connector clip 202B extend through and project outwardly relative to the access window of its associated pocket, thereby allowing the arms 226 to be inserted through the openings 224 as the panels 120 are brought into abutting engagement or otherwise pushed together at their top ends 122.

In other embodiments, the interlocking male/female connection structure described above may be provided in any other suitable arrangement. For instance, in one embodiment, the fastener openings 224 may be defined through the body 204 of the second connector clip 202B, with the fastener arms 226 extending outwardly from the first connector clip 202A for receipt within the openings 224. Alternatively, each connector clip 202A, 202B may be configured to include both male/female connection features. For instance, as will be described below with reference to the embodiment shown in FIG. 11, one of the fastener openings 224 of the first connector clip 202A may be replaced with a fastener arm 226 configured to extend outwardly from the first connector clip 202A. In such an embodiment, one of the fastener arms 226 of the second connector clip 202B may be replaced with a fastener opening 224 configured to receive the corresponding fastener arm 226 of the first connector clip 202A.

It should also be appreciated that, as an alternative to the male/female connection structure described above, the connector clips 202A, 202B may include any other suitable connection structure that allows the clips 202A, 202B to be coupled together. For instance, in other embodiments, buttons, snaps, magnets, hook-and-loop fasteners, and/or other suitable mechanical fasteners may be used as connection structure for coupling the connector clips 202A, 202B to each other.

Referring still to FIGS. 5 and 6, one or both of the connector clips 202A, 202B may include mounting structure for coupling the clip assembly 200 to a corresponding hanger 108 or any other suitable mounting hardware used to suspend the panel assembly 104 relative to the track 107 of the associated support structure 106. For instance, as shown in the illustrated embodiment, the first connector clip 202A includes a mounting port 234 defined through its clip body 204 between the first and second outer faces 214, 216 of the clip 202A that is spaced vertically apart from the top side 220 of the clip 202A. Additionally, as particularly shown in FIG. 5, the second connector clip 202B includes a mounting channel 236 defined through its clip body 204 between the first and second outer faces 214, 216 of the clip 202B that is open along the top side 220 of the clip 202B. In such an embodiment, when the connector clips 202A, 202B are coupled together (e.g., via the corresponding connection structure), the mounting channel 236 of the second connector clip 202B may generally be aligned with the mounting port 234 of the first connector clip 202A (e.g., in the crosswise direction 212) to allow a portion of the corresponding hanger 108 of the support structure 106 (e.g., a hooked end 109 of the hanger 108 as shown in the dashed lines of FIG. 6) to be inserted through both the mounting channel 236 and mounting port 234 to couple the clip assembly 200 to the support structure 106. In such an embodiment, the hanger 108 may directly engage the portion of the first connector clip 202A extending above the mounting port 234 (e.g., a connection bridge 238 of the clip body 204) to vertically support the first connector clip 202A (and, thus, the second connector clip 202B by way of its connection to the first clip 202A) relative to the associated support structure 106.

It should be appreciated that the longitudinal positioning of the mounting structure relative to the longitudinal ends 208, 210 of each clip 202A, 202B may generally be selected to ensure that the mounting structure is aligned with the access windows 164, 166 (FIG. 4) defined in the respective pockets 140, 142 within which the clips 202A, 202B are installed when the clips 202A, 202B are coupled to each other (e.g., via the connection structure). For instance, as shown in FIG. 5, the mounting port 234 of the first connector clip 202A and the mounting channel 236 of the second connector clip 202B are each positioned between the connection structure of the respective clip 202A, 202B in the longitudinal direction 206. As such, upon coupling the connector clips 202A, 202B together (e.g., as installed within the pockets of adjacent panels), it can be ensured that the mounting structure is aligned with the access windows 164, 166 of the pockets 140, 142 when subsequently securing the clip assembly 200 to a corresponding hanger 108 for suspending the panels 120 relative to the associated support structure 106.

Figure 11:
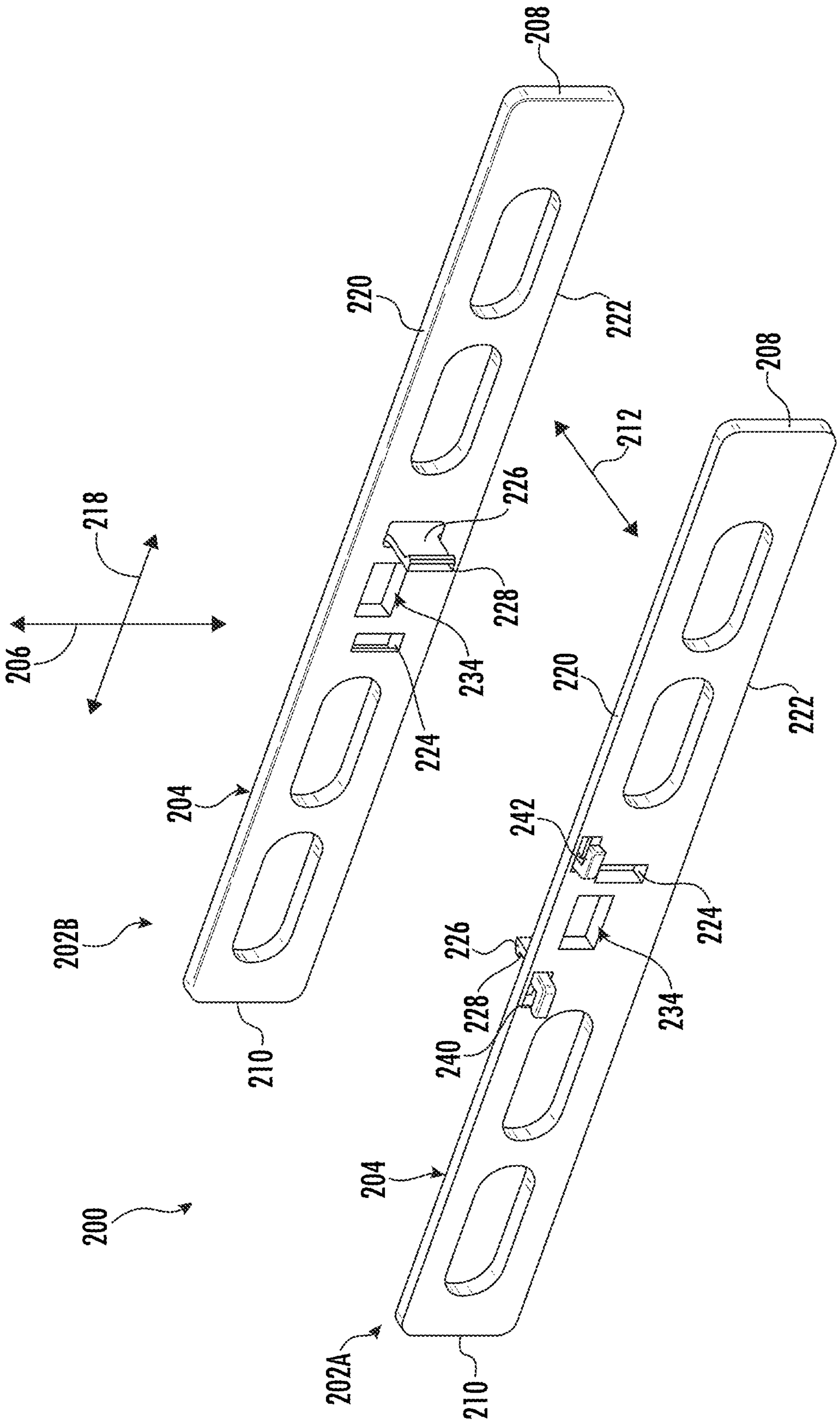
FIG. 11 illustrates a perspective view of another embodiment of connector clips of a clip assembly suitable for use in coupling adjacent panels of a vertical curtain blind together in accordance with aspects of the present subject matter.

It should be appreciated that, in other embodiments, any other suitable mounting structure and/or configuration may be used to couple the clip assembly 200 to the mounting hardware (e.g., hangers 108) used to suspend the panel assembly 104 relative to the track 107 of the support structure 106. For instance, in one alternative embodiment, the first connector clip 202A may define the open-ended mounting channel 236, while the second connector clip 202B defines the closed-off mounting port 234. In another alternative embodiment, the first and second connector clips 202A, 202B may both define a closed-off mounting port 234 (e.g., as shown in the embodiment of FIG. 11), thereby providing a direct connection between the hanger 108 and each connector clip 202A, 202B.

Moreover, in several embodiments, one or both of the connector clips 202A, 202B may also include separate retention structure extending outwardly from an outer face of the clip 202A, 202B opposite the connection interface 227 defined between the clips 202A, 202B, with the retention structure generally being configured to retain the clip(s) 202A, 202B relative to the pocket(s) of the panel(s) within which the clip(s) 202A, 202B is installed. For instance, as shown in FIGS. 5 and 6, the first connector clip 202A includes first and second retention members 240, 242 (e.g., in the form of retention flanges or hooks) that extend outwardly from the first outer face 214 of the clip 202A. As a result, when the clips 202A, 202B are coupled together, the retention members 240, 242 project outwardly away from (and are positioned on the opposite side of the clip 202A relative to) the connection interface 227 defined between the clips 202A, 202B.

In one embodiment, the retention members 240, 242 are longitudinally positioned along the first outer face 214 of the clip 202A between the clip's opposed ends 208, 210 such that, when the clip 202A is installed within a pocket of a given panel, the retention members 240, 242 extend through the access window of the pocket and engage the outer edges of the window. Specifically, in one embodiment, a longitudinal distance 244 defined between the outer ends of the hooked retention members 240, 242 may be selected to be slightly greater than the width 168 (FIG. 4) of the access windows 164, 166 defined in the pockets 140, 142, with a longitudinal distance 246 defined between inner sections of the hooked retention members 240, 242 being selected to be slightly smaller than the width 168 of the access windows 164, 166. As such, when installing the connector clip 202A within a pocket of a given panel, the retention members 240, 242 may be inserted through the respective access window and hook around the outer edges of the window to maintain the relative positioning of the connector clip 202A within the pocket.

Additionally, in one embodiment, the longitudinal distance or gap 244 defined between the outer ends of the hooked retention members 240, 242 may also form a longitudinal retention zone 245 (FIG. 6) of the clip assembly 200 within which the separate connection structure and mounting structure of the connector clips 202A, 202B is positioned. Specifically, as shown in FIG. 6, the connection structure of each clip 202A, 202B (e.g., the fastener openings/arms 224, 226) is positioned entirely between the outer ends of the hooked retention members 240, 242 in the longitudinal direction 206 and, thus, is positioned within the longitudinal retention zone 245 of the clip assembly 200. Similarly, the mounting structure of each clips 202A, 202B (e.g., the mounting port 234 and mounting channel 236) is positioned entirely between the outer ends of the hooked retention members 240, 242 in the longitudinal direction 206 and, thus, is positioned within the longitudinal retention zone 245 of the clip assembly 200. As indicated above, the mounting structure of each clip 202A, 202B is also positioned entirely between the correspond connection structure of each respective clip 202A, 202B in the longitudinal direction 206.

It should be appreciated that, although not shown, the second connector clip 202B may also include separate retention structure for retaining the clip 202B relative to the pocket of the panel within which the clip 202B is installed. For instance, similar to the first connector clip 202A, the second connector clip 202B may include first and second retention members 240, 242 (e.g., in the form of retention flanges or hooks) that project outwardly from the outer face of the clip 202B opposite the connection interface 227 (e.g., the second outer face 216 of the clips 202B). In such an embodiment, the retention members 240, 242 of the second clip 202B may be configured to extend through an adjacent access window and hook around the outer edges of the window to retain the clip 202B relative to the associated pocket. As an alternative to including separate retention structure, it should be appreciated that the connection structure of the second connector clip 202B may also function as retention structure for such clip 202B. For example, the fastener arms 226 may function to limit longitudinal travel of the second connector clip 202B within its associated pocket as the arms 226 contact against or otherwise engage the outer edges of the respective access window.

Additionally, it should be appreciated that, in several embodiments, the connector clips 202A, 202B may also include a visual indicator(s) for identifying the proper orientation and/or installation direction when installing the clips 202A, 202B within their associated pockets. For instance, as shown in FIG. 5, the second connector clip 202B includes a label 248 identifying the top side 220 of the clip 202B as well as an arrow 250 identifying the direction in which the clip 202B is to be installed within an associated pocket. Although not shown, the first connector clip 202A may include similar visual indicators to identify the clip's proper orientation and/or installation direction.

A process or method for coupling adjacent panels of a vertical curtain blind together will now be described with reference to FIGS. 7-9. In general, the method will be described with reference to the vertical curtain blind 100 and related panels 120 and connector clips 202 described above with reference to FIGS. 1-6. However, it should be appreciated that, in other embodiments, the disclosed method may be utilized with blinds having any other suitable configuration, with panels having any other suitable panel configuration, and/or connector clips having any other suitable configuration. It should also be appreciated that, for purposes of discussion, the first connector clip 202A of the above-described clip assembly 200 will generally be described herein as corresponding to the "right-side connector clip" configured to be inserted within the first or right-side pocket 140 of a panel 120, while the second connector clip 202B of the above-described clip assembly 200 will generally be described herein as corresponding to the "left-side connector clip" configured to be inserted within the second or left-side pocket 142 of an adjacent panel 120. However, in other embodiments, the installation configuration may be reversed, with the first connector clip 202A being inserted within the second or left-side pocket 142 of a panel 120 and the second connector clip 202B being inserted within the first or right-side pocket 140 of an adjacent panel 120.

Figure 7:
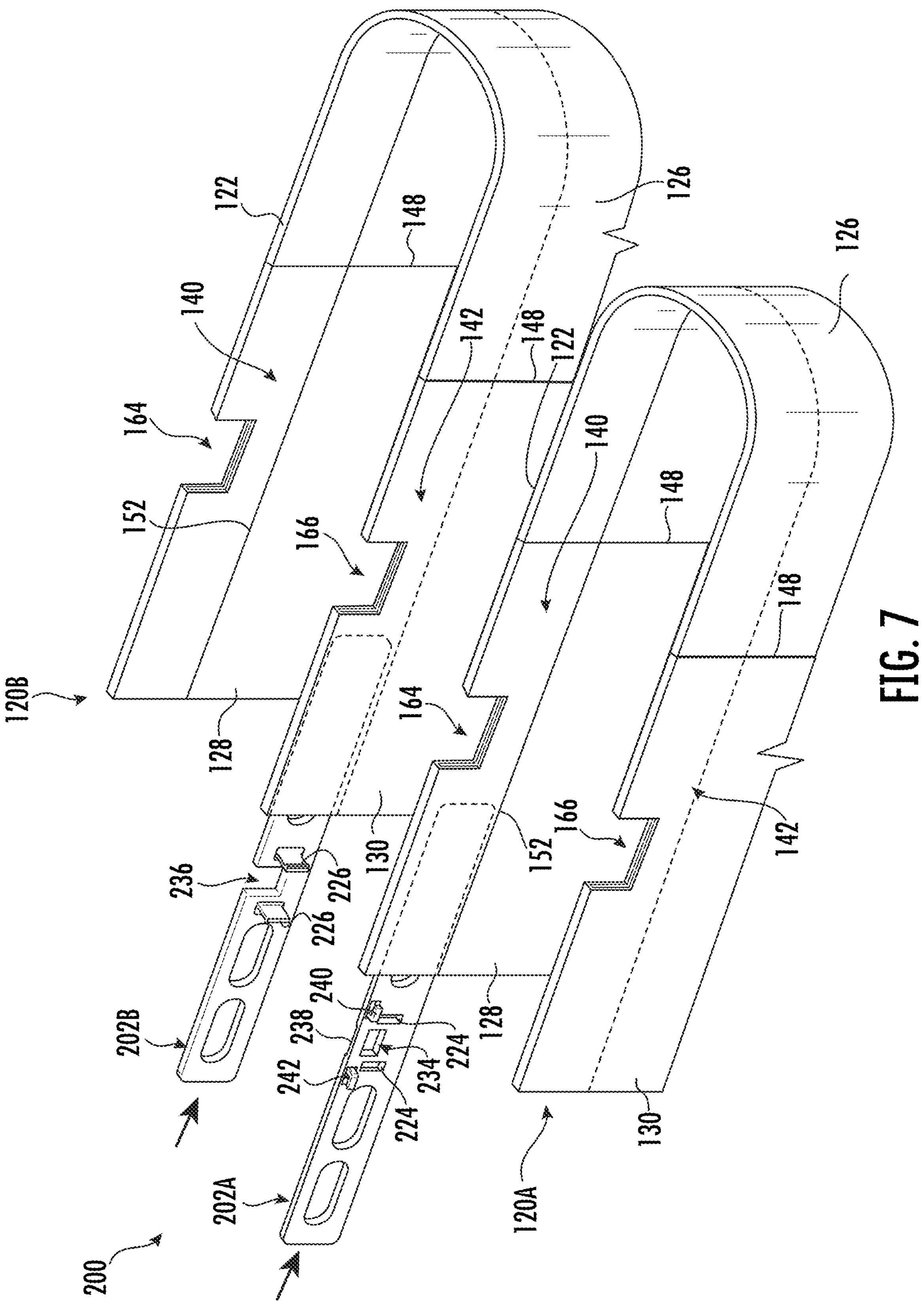
FIG. 7 illustrates a perspective view of adjacent panels of a vertical curtain blind and associated connector clips for coupling the panels together in accordance with aspects of the present subject matter, particularly illustrating the clips being installed within corresponding clip pockets of the panels.
Figure 8:
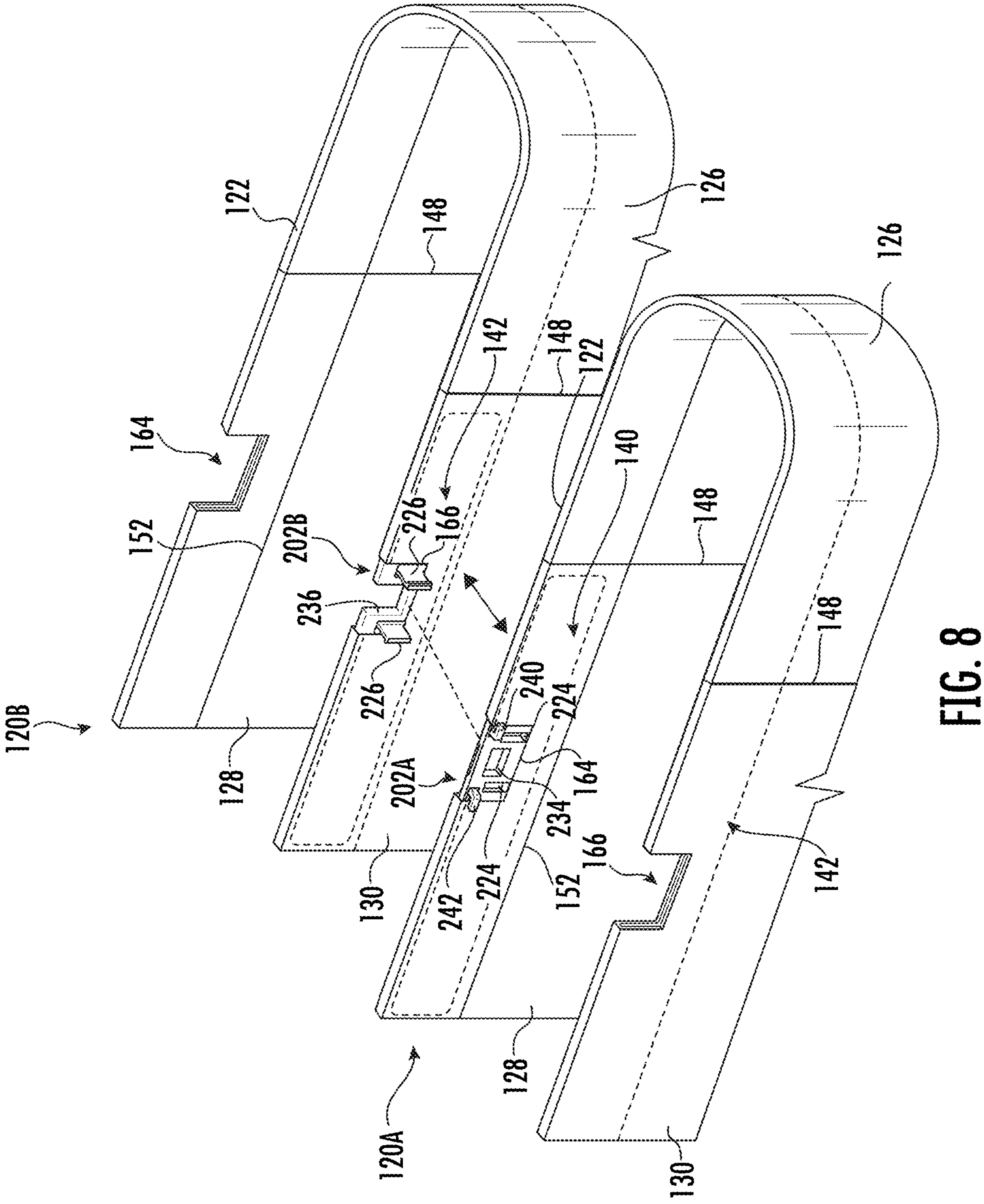
FIG. 8 illustrates another perspective view of the panels and connector clips shown in FIG. 7, particularly illustrating the clips fully installed within corresponding clip pockets of the panels.
Figure 9:
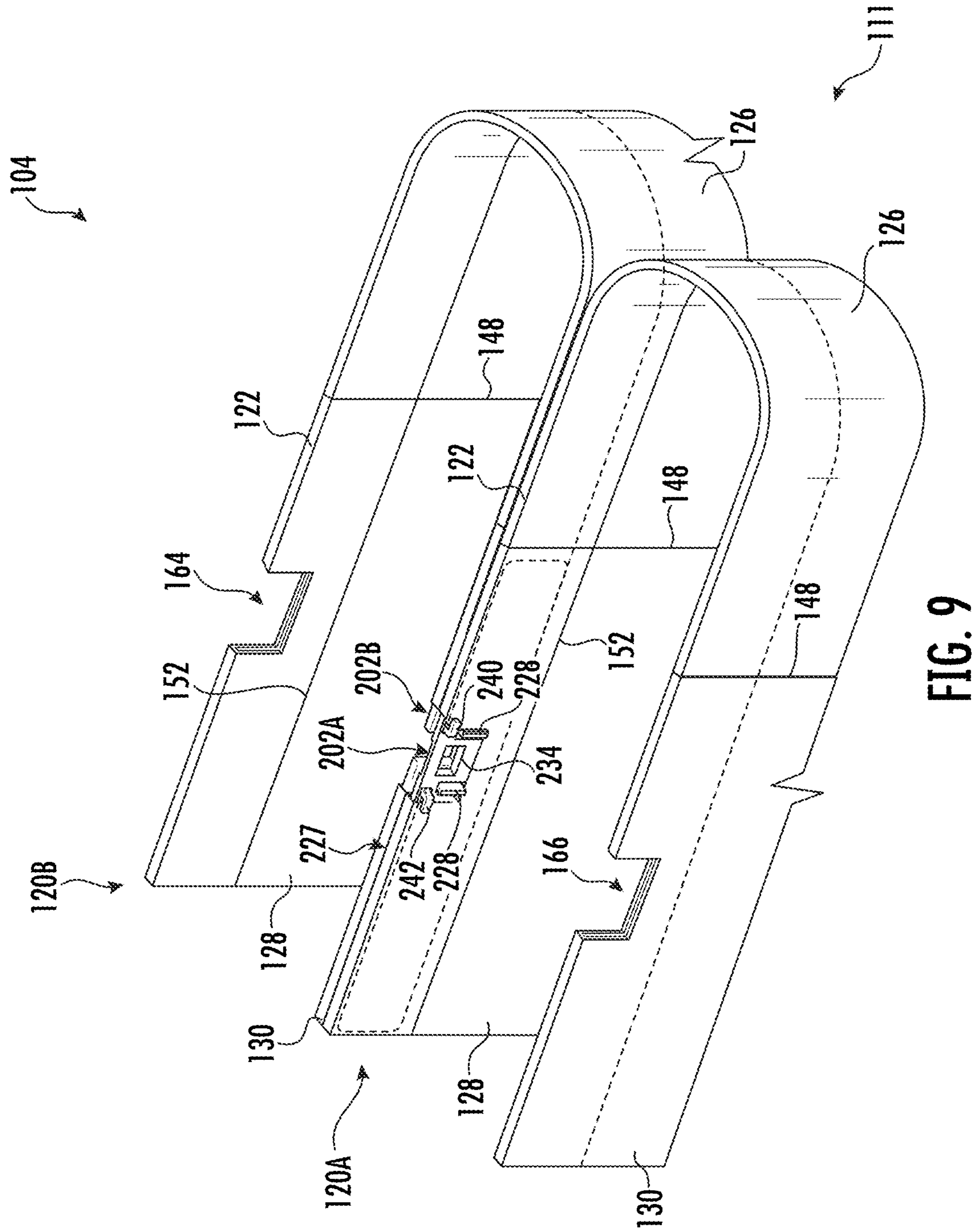
FIG. 9 illustrates a further perspective view of the panels and connector clips shown in FIGS. 7 and 8, particularly illustrating the panels coupled together in a side-by-side arrangement via the clips.

Referring to FIGS. 7-9, the upper portions of two adjacent panels 120 (e.g., a first panel 120A and a second panel 120B) forming a portion of a panel assembly 104 are illustrated for purposes of describing the disclosed method. In general, the panels 120A, 120B are configured the same as the panel 120 described above with reference to FIG. 4. For instance, each panel 120A, 120B includes a light-transmitting front wall 126 and first and second light-blocking sidewalls, 128, 130, with a first or right-side pocket 140 being formed at the top end 122 of each panel 120A, 120B along the first sidewall 128 and a second or left-side pocket 142 formed at the top end 122 of each panel 120A, 120B along the second sidewall 130. As particularly shown in FIG. 7, to couple the first and second panels 120A, 120B together, the connector clips 202A, 202B of a given clip assembly 200 are initially installed into the adjacent pockets 140, 142 of the panels 120A, 120B. For instance, in the illustrated embodiment, the first connector clip 202A is being installed within the right-side pocket 140 of the first panel 120A while the second connector clip 202B is being installed within the left-side pocket 142 of the second panel 120B, thereby allowing the panels 120A, 120B to be coupled together at their top ends 122 in a side-by-side arrangement in which the first lateral sidewall 128 of the first panel 120A will generally extend adjacent to the second lateral sidewall 130 of the second panel 120B when the panels 120A, 120B are subsequently suspended from the associated support structure 106 of the blind 100 as part of the overall panel assembly 104.

As particularly shown in the transition from FIG. 7 to FIG. 8, the connector clips 202A, 202B are configured to be inserted into the pockets 140, 142 until the mounting/connection/retention structure of each clip 202A, 202B is generally aligned with the adjacent access window 164, 166 of its respective pocket 140, 142. For instance, as shown in FIG. 8, the first connector clip 202A may be configured to be positioned within its respective pocket 140 such that the retention structure of the clip 202A (e.g., the first and second hooked retention members 240, 242) extends through and projects outwardly from the access window 164 of such pocket 140, thereby allowing the retention members 240, 242 to engage the edges of the access window 164 and maintain the first connector clip 202A at the desired position within the pocket 140. Similarly, as shown in FIG. 8, the second connector clip 202B may be configured to be positioned within its respective pocket 142 such that the connection structure of the clip 202B (e.g., the fastener arms 226) extends through and projects outwardly from the access window 166 of such pocket 142. Additionally, as shown in FIG. 8, when the connector clips 202A, 202B are installed within their respective pockets 140, 142, the mounting/connection/retention structure of each clip 202A, 202B is generally positioned below the top end 122 of its corresponding panel 120A, 120B.

Upon properly positioning the connector clips 202A, 202B within their respective pockets 140, 142, the adjacent lateral sidewalls 128, 130 of the panels 120A, 120B may then be moved towards each other to allow the connector clips 202A, 202B to be coupled together (thus coupling the top end 122 of the first panel 120A to the top end 122 of the second panel 120B). For instance, as particularly shown in the transition from FIG. 8 to FIG. 9, by moving the panels 120A, 120B towards one another in a side-by-side arrangement, the fastener arms 226 of the second connector clip 202B may be received within and pushed through the fastener openings 224 of the first connector clip 202A until the engagement flanges 228 of the arms 226 snap outwardly to engage the adjacent outer face of the first connector clip 202A, thereby coupling the clips 202A, 202B together. The panels may then be separately coupled to the corresponding mounting hardware of the support structure 106 (e.g., via the mounting structure of the connector clips 202A, 202B) to suspend the panels 120A, 120B relative thereto. For instance, as described above with reference to FIG. 6, a hooked end 109 of one of the hangers 108 may be inserted through the aligned mounting channel 236 and mounting port 234 of the connector clips 202A, 202B in order to suspend the panels 120A, 120B relative to the track 107 of the support structure 106.

It should be appreciated that, by positioning the connector clips 202A, 202B in their respective pockets 140, 142 in the manner described above, the clips 202A, 202B may be substantially or entirely concealed or otherwise hidden from view. For instance, as shown in FIG. 9, with the panels 120A, 120B coupled together, the connector clips 202A, 202B should not be visible along the front face 111 of the associated panel assembly 104. Moreover, by positioning the associated mounting structure of the connector clips 202A, 202B below the top ends 122 of the panels 120A, 120B, the connection between the panels 120A, 120B and the associated hanger 108 is similarly positioned below the top ends 122 of the panels 120A, 120B. As a result, the top end 110 of the associated panel assembly 104 can be positioned directly adjacent to the track 107 of the support structure when suspended therefrom via the hangers 108, thereby eliminating or minimizing lights gaps between the track 107 and the panel assembly 104.

Figure 10:
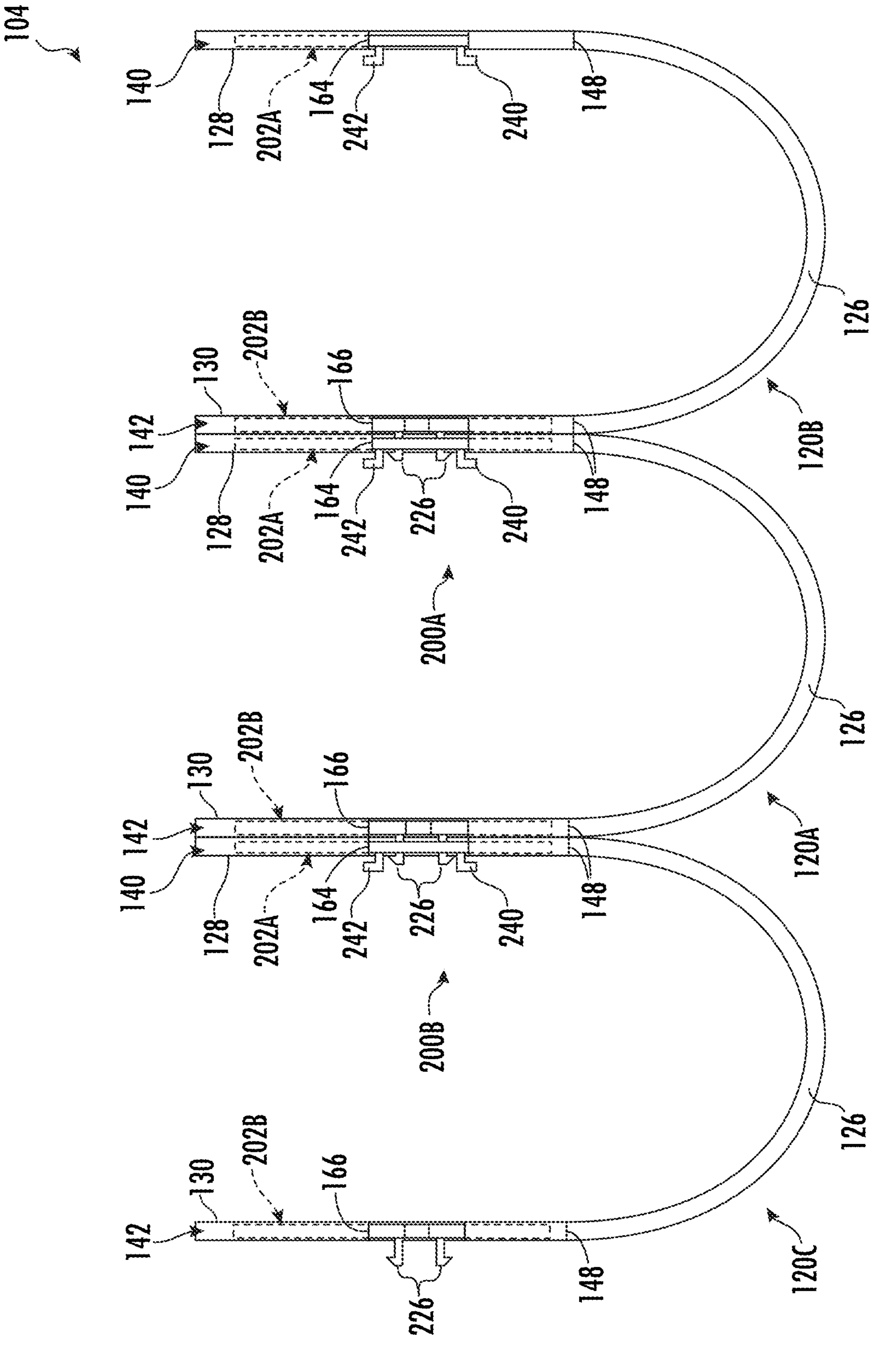
FIG. 10 illustrates a top view of three panels of a vertical curtain blind coupled together in a side-by-side arrangement with a clip assembly being used to couple each panel to an adjacent panel in accordance with aspects of the present subject matter.

Referring now to FIG. 10, a top view of three adjacent panels 120A, 120B, 120C assembled together in a side-by-side arrangement in a manner consistent with the above-described panel-connection method is illustrated in accordance with aspects of the present subject matter. As shown in FIG. 10, first and second clip assemblies 200A, 200B are used to couple a given panel (e.g., central panel 120A) to two adjacent panels (e.g., a first adjacent panel 120B and a second adjacent panel 120C). Specifically, as shown, the first clip assembly 200A includes a first connector clip 202A installed within the right-side pocket 140 of the central panel 120A and a second connector clip 202B installed within the left-side pocket 142 of the first adjacent panel 120B, thereby allowing central panel 120A to be coupled to the first adjacent panel 120B. Similarly, the second clip assembly 200B includes a first connector clip 202A installed within the right-side pocket 140 of the second adjacent panel 120C and a second connector clip 202B installed within the left-side pocket 142 of the central panel 120A, thereby allowing central panel 120A to be coupled to the second adjacent panel 120C. As indicated above, upon coupling the adjacent panels 120A 120B, 120C together, the panels may be suspended from the track 107 of the support structure 106 by coupling the corresponding mounting hardware to the mounting structure of each clip assembly 200A, 200B. For instance, a first hanger 108 may be coupled to the mounting structure of the first clip assembly 200A to vertically support the adjacent sides of the central panel 120A and the first adjacent panel 120B relative to the support structure 106. Similarly, a second hanger 108 may be coupled to the mounting structure of the second clip assembly 200B to vertically support the adjacent sides of the central panel 120A and the second adjacent panel 120C relative to the support structure 106.

It should be appreciated that, although FIG. 10 only shows three panels 120 coupled together in a side-by-side arrangement, any suitable number of panels 120 may be coupled together to form a panel assembly 104 in accordance with aspects of the present subject matter. In particular, the specific number of panels 120 used to form the panel assembly 104 may generally very, for example, based on the lateral width of the architectural structure 102 relative to which the associated blind 100 is to be installed.

Additionally, it should be appreciated that, in the embodiments of the clip assemblies 200 described above with reference to FIGS. 5-10, the first and second connector clips 202A, 202B of each clip assembly 200 have different configurations (e.g., differences between the connection/mounting/retention structure of the clips 202A, 202B). However, in other embodiments, the connector clips 202 of each clip assembly 200 may, instead, have the same configuration. For instance, FIG. 11 illustrates a perspective, exploded view of a clip assembly 200 in which the first and second connector clips 202A, 202B have the exact same configuration or are otherwise identical. Specifically, as shown, both connector clips 202A, 202B have the same mounting structure (e.g., matching mounting ports 234), the same connection structure (e.g., one fastener arm 226 and one fastener opening 224), and the same retention structure (e.g., first and second hooked retention members 240, 242—although the retention members for the second connector clip 202B are not shown in FIG. 11). In such an embodiment, to couple the connector clips 202A, 202B together, one of the clips simply needs to be rotated 180 degrees relative to the other clip to allow the connection structure of the clips to be properly aligned. For instance, in the embodiment of FIG. 11, the second connector clip 202B has been flipped relative to the first connector clip 202A to facilitate inserting the fastener arms 226 of each clip 202A, 202B within the corresponding fastener openings 224 of the opposed clip 202A, 202B. In such an embodiment, it should be appreciated that, given the vertical positioning of the retention structure of the connector clips 202A, 202B, the first and second retention members 240, 242 of the flipped second connector clip 202B will be located closer to the bottom side of the clip 202B (as opposed to being located closer to the top side as shown in FIG. 11 for the first connector clip 202A). However, in other embodiments, the retention structure may, instead, be centered on each clip 202A, 202B relative to the heightwise direction 218 such that the retention members 240, 242 are disposed at the same height regardless of which connector clip 202A, 202B is flipped to facilitate coupling the clips together.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A vertical curtain blind, comprising:

a panel assembly comprising a plurality of individual panels coupled together in a side-by-side arrangement, each panel extending in a vertical direction between a top end and a bottom end, each panel including first and second pockets positioned along first and second sides of the panel, respectively, adjacent to the top end of the panel; and a plurality of clip assemblies, each clip assembly being configured to couple a respective pair of adjacent panels of the plurality of panels together, each clip assembly including a first connector clip positioned within the first pocket of a first panel of the respective pair of adjacent panels and a second connector clip positioned within the second pocket of an adjacent second panel of the respective pair of adjacent panels, with the first connector clip configured to be coupled to the second connector clip;

wherein:

the first connector clip includes connection structure configured to engage corresponding connection structure of the second connector clip to couple the first and second connector clips together;

a first access window is defined through the first pocket of the first panel at the top end of the first panel and a second access window is defined through the second pocket of the second panel at the top end of the second panel; and the connection structures of the first and second connector clips are positioned below the top ends of the first and second panels and are aligned with the first and second access windows.

2. The vertical curtain blind of claim 1, wherein:

each of the first and second access windows defines a longitudinal width in a longitudinal direction of the clip assembly and each of the first and second access windows extends in a heightwise direction of the clip assembly between a bottom end and an open top end, with the open top end being aligned with the top end of the respective first panel or second panel; and the connection structure of the first and second panels are positioned below the open top ends of the first and second access windows and are aligned with the first and second access windows in the longitudinal direction.

3. The vertical curtain blind of claim 1, wherein the entirety of each of the first and second connector clips is positioned below the top ends of the first and second panels.

4. The vertical curtain blind of claim 1, wherein:

at least one of the first connector clip or the second connector clip includes mounting structure configured to couple the clip assembly to a hanger for vertically suspending the panel assembly relative to support structure for the blind; and the mounting structure is positioned below the top end of the first and second panels and is aligned with the first and second access windows.

5. The vertical curtain blind of claim 4, wherein:

the mounting structure comprises a mounting port defined through the at least one of the first connector clip or the second connector clip; and a portion of the hanger is configured to extend through the mounting port and engage the at least one of the first connector clip or the second connector clip.

6. The vertical curtain blind of claim 5, wherein the mounting port is positioned between the connection structures of the first and second connector clips in a longitudinal direction of the clip assembly.

7. The vertical curtain blind of claim 5, wherein the portion of the hanger is configured to extend through the first and second access windows at a location below the top end of the first and second panels.

8. The vertical curtain blind of claim 1, wherein the connection structure of the first connector clip includes one of a male connection structure or a female connection structure and the connection structure of the second connector clip includes the other of the male connection structure or the female connection structure.

9. The vertical curtain blind of claim 8, wherein the male connection structure comprises a fastener arm and the female connection structure comprises a fastener opening configured to receive the fastener arm.

10. The vertical curtain blind of claim 9, wherein:

the fastener arm extends outwardly from a body of the second connector clip and the fastener opening is defined through a body of the first connector clip; and the fastener arm further comprises an engagement flange configured to engage an adjacent face of the first connector clip when the fastener arm is inserted through the fastener opening.

11. The vertical curtain blind of claim 1, wherein:

at least one of the first connector clip or the second connector clip includes retention structure separate from the connection structure that extends outwardly from an outer face of the at least one of the first connector clip or the second connector clip; and the retention structure is positioned below the top end of the first and second panels and is at least partially aligned with at least one of the first access window or the second access window.

12. The vertical curtain blind of claim 11, wherein:

when the first and second connector clips are coupled together, a connection interface is defined between adjacent outer faces of the first and second connector clips; and the outer face is positioned opposite the connection interface defined between the first and second connector clips.

13. The vertical curtain blind of claim 11, wherein the retention structure is configured to maintain the positioning of the clip assembly relative to the first and second panels of the respective pair of adjacent panels.

14. The vertical curtain blind of claim 11, wherein the retention structure comprises first and second longitudinally spaced retention members extending outwardly from the first connector clip.

15. The vertical curtain blind of claim 14, wherein the first and second retention members extend through the first access window and are configured to engage opposed edges of the first access window to maintain the positioning of the first connector clip relative to the first pocket.

16. The vertical curtain blind of claim 15, wherein the first and second retention members are configured to hook around the opposed edges of the access window.

17. The vertical curtain blind of claim 1, wherein each panel includes a light-transmitting portion extending vertically between the top and bottom ends of the panel and first and second light-blocking portions extending vertically between the top and bottom ends of the panel along opposed sides of the light-transmitting portion.

18. The vertical curtain blind of claim 17, wherein the first pocket of each panel extends laterally across the first light-blocking portion of the panel and the second pocket of each panel extends laterally across the second light-blocking portion of the panel.

19. The vertical curtain blind of claim 1, wherein the first and second pockets of each panel are formed from a folded-over lateral section of the panel extending from the top end of the panel.

20. The vertical curtain blind of claim 19, wherein the first and second pockets of each panel comprise respective portions of an open-ended channel defined at least partially by the folded-over lateral section of the panel.

* * * * *